Dec. 7, 1971  E. SCIME  3,624,884
TRANSMISSION REPAIR TOOL

Filed Aug. 19, 1969  2 Sheets-Sheet 1

INVENTOR.
EMILIO E. SCIME

ATTORNEYS

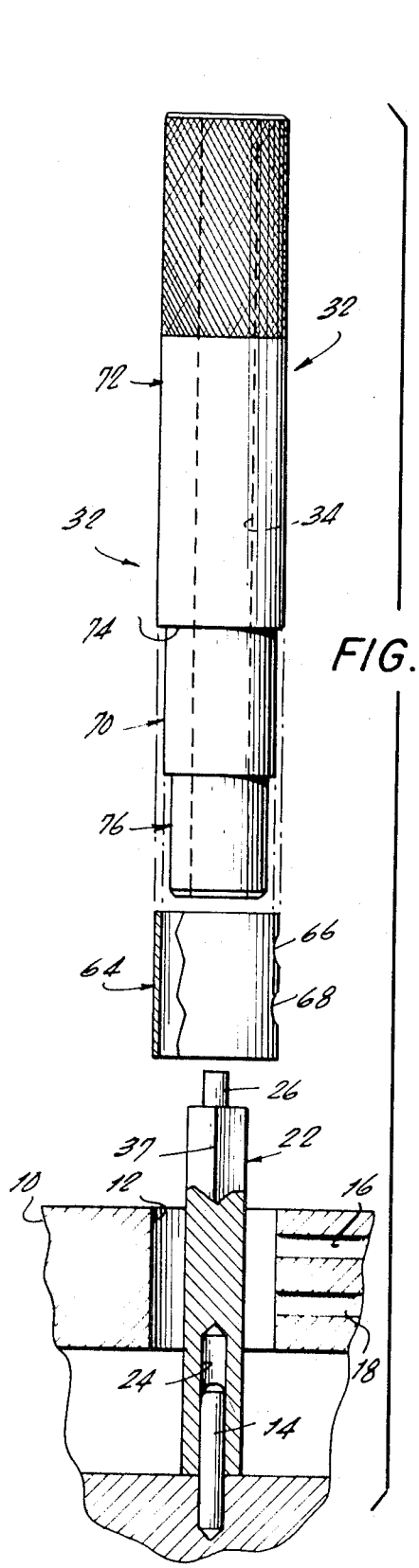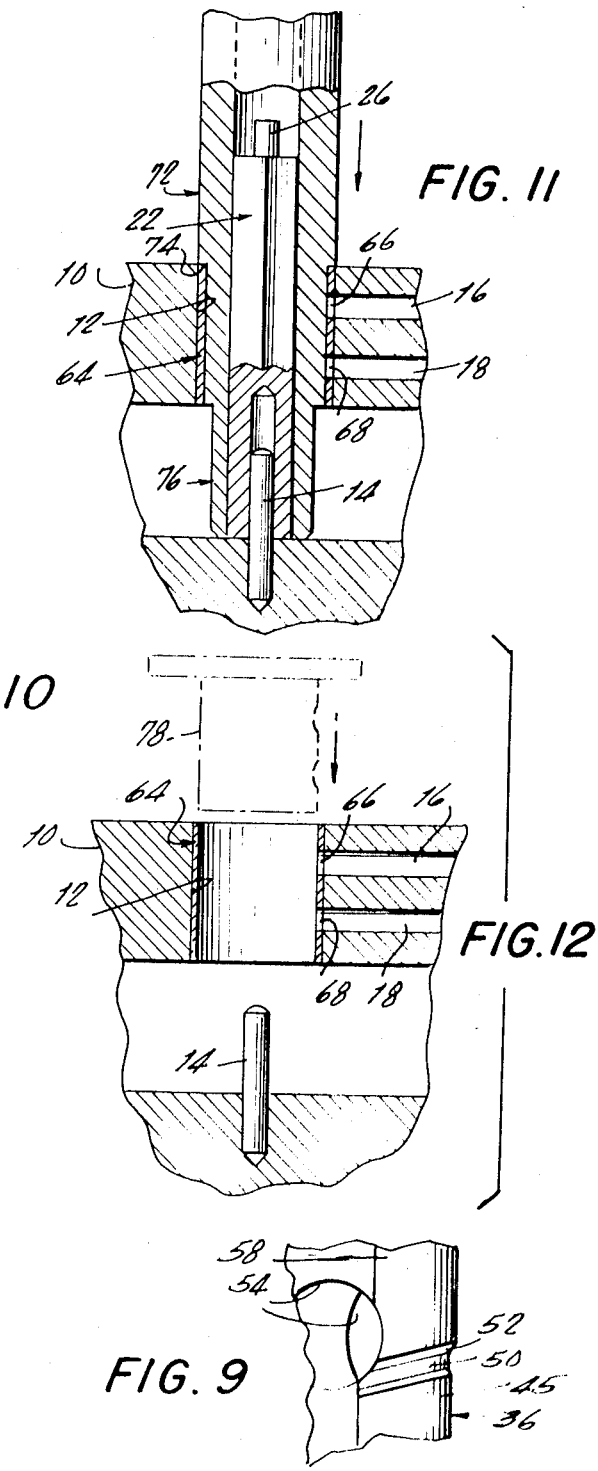

United States Patent Office 3,624,884
Patented Dec. 7, 1971

3,624,884
TRANSMISSION REPAIR TOOL
Emilio Scime, 919 65th Ave., Brooklyn, N.Y. 11223
Filed Aug. 19, 1969, Ser. No. 860,143
Int. Cl. B23p 19/00; B25b 27/06
U.S. Cl. 29—200 P                   12 Claims

ABSTRACT OF THE DISCLOSURE

A bore, such as a governor bore in a transmission housing, is repaired by employing a first tool for burnishing and enlarging the bore and a second tool for installing a bushing in the enlarged bore so as to restore the bore to its original diameter. Each of the tools is aligned within the bore when in use by means of an alignment guide which is mounted in the axis of the bore and which slidably engages the tool.

---

The present invention relates generally to tools for repairing a bore. More particularly, the present invention relates to a tool kit having particular utility in reboring openings in transmission housings.

Numerous automatic transmissions in current use include a governor which regulates the flow of a control fluid that in turn controls the operation of the gear system. The governor is contained within the transmission housing in a bore provided for that purpose. When the bore becomes worn and there is leakage around the edge of the governor it is necessary to rebore the opening and insert a bushing. It has not been practical to do this with the transmission in the car because of space and size limitations and, thus, this operation has been a time-consuming and very expensive procedure.

It is an object of the present invention to provide an inexpensive method of repairing a transmission housing.

It is another object of the invention to provide simple, hand operated tools for repairing the governor bore in a transmission housing.

Yet another object of the invention is to provide a tool kit for inexpensively repairing a transmission housing governor bore which is self-aligning and which does not require the utilization of expensive machine tools and/or auxiliary guide means.

The above objects are accomplished by providing a tool kit comprising a first tool for burnishing and boring the governor bore and a second tool for inserting a bushing into the governor bore, the bushing having the same internal diameter and surface characteristics of the original governor bore. By taking advantage of the structural features of the governor as well as by providing self-supporting and self-aligning tools, the need for auxiliary alignment aids is eliminated.

The invention will be further understood by reference to the following detailed description of a presently preferred, illustrative embodiment of the invention when taken with the accompanying drawings, wherein:

FIG. 9 is an enlarged partial perspective view of the cutting edge of the boring tool illustrated in FIGS. 4 and 5;

FIG. 10 is an exploded perspective view (partially in section) of the tool for inserting a bushing into the governor valve bore;

FIG. 11 is a partial sectional view of the arrangement shown in FIG. 10 illustrating the assembled operative relationship of the parts; and FIG. 12 is a partial sectional view showing the relationship between a bushing, governor valve and the governor bore.

Figure 2:
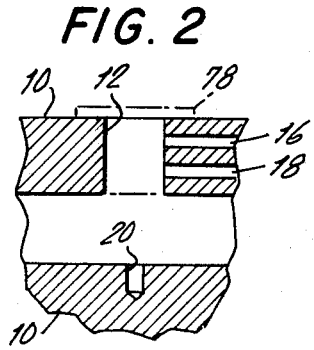
FIG. 2 is a sectional view of a variation in the form of transmission housings and governor bores which may be repaired with the tools of the present invention.
Figure 1:
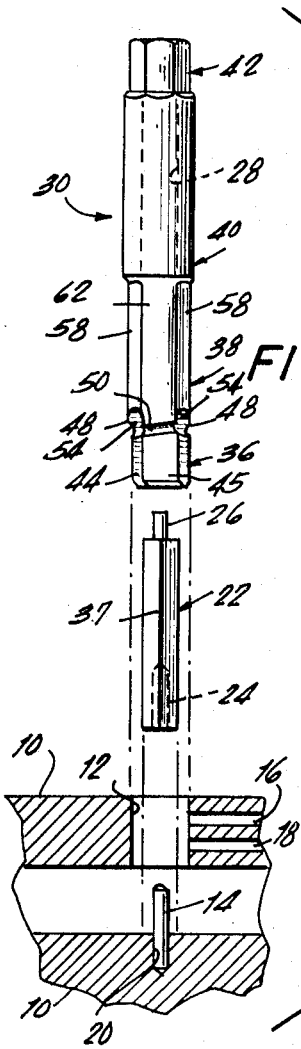
FIG. 1 is an exploded perspective view (partially in section), of a burnishing and boring tool in accordance with the present invention shown prior to its insertion into a governor bore of a transmission housing.

Referring more particularly to the drawings, FIG. 1 schematically depicts a transmission housing 10 having a bore 12 which houses a governor valve (not shown). When the governor valve is in its operative position, it is aligned with a governor dowel peg 14 which is centered beneath the governor bore. The movement of the valve regulates the flow of a control fluid through channels 16 and 18 and this fluid, in turn, regulates the operation of the automatic transmission. As shown in FIG. 2, in some other transmissions the governor dowel peg may actually be replaced by a hole 20 at the same location which receives a pin on the mating part.

FIGS. 2 and 3 and FIGS. 10 and 11 illustrate the cooperation of the boring and bushing installer tools respectively of the invention. The successful operation of both tools is dependent upon the utilization of alignment guide 22. Alignment guide 22, which is preferably of a generally square shape is provided with dowel peg mating means 24 at one of its ends, the other end being provided with a peg 26 capable of mating with dowel peg hole 20 in the event that a transmission housing comparable to that shown in FIG. 2 is being repaired. The alignment guide snugly fits within the hollowed interior 28 of the boring tool which is generally designated as 30. Similarly, when the bushing aligning tool, which is generally designated as 32 herein, is employed, the alignment guide 22 fits within its hollow interior 34. The dimensions of the hollowed interior 28 or 34 and the alignment guide 22 are selected so that the guide may slide freely back and forth within said hollow in the longitudinal direction but may not move in a transverse direction, i.e., perpendicular to the walls of the hollow interior of the tool. In a preferred embodiment the edges 37 of the alignment guide are slightly rounded or flattened forming a bearing surface in order to avoid any wedging or binding action within the interior of the tool thereby permitting relatively free longitudinal movement of the tool on the alignment guide.

Figure 3:
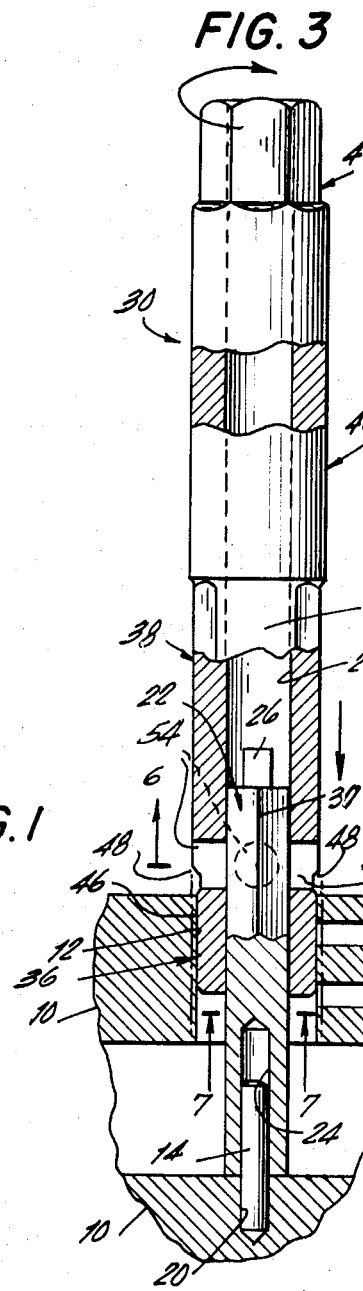
FIG. 3 is an enlarged sectional view of the arrangement shown in FIG. 1 illustrating the assembled, operative relationship of the parts.

The alignment guide is a significant feature of the present invention since it is the initial source of alignment and, when placed in position over the centered governor dowel peg 14 or within dowel peg hole 20, acts as a centering means for the tool. With the alignment guide in position, the boring or bushing aligning tool slidably engages the alignment guide and, as shown in FIGS. 3 and 11, enters the governor bore 12 substantially centered and substantially perpendicular with respect to the bore. This relationship is maintained throughout any subsequent operations since the alignment guide prevents any movement of the tool except along the axis of the guide.

Turning more particularly to the details of the boring tool 30, the boring tool comprises a burnishing end 36, a boring section 38, a handle section 40 and a drive section 42. The burnishing section 36 has substantially the same external diameter as the internal diameter of the governor bore 12 and by means of a series of notched longitudinal teeth 44 burnishes the internal surfaces of the governor bore 12 thereby removing small rough particles of material which may have resulted from scoring or wear on the governor bore during use. The burnishing action of teeth 44 rotating in a clockwise direction does not substantially change the inner diameter of bore 12 but merely polishes that surface. Clockwise rotation of the burnishing tool is achieved by the use of a drive socket, a T-handle and socket arrangement or similar means on boring tool head 42. The head 42 has a convenient shape e.g. hexagonal, which is adapted to mate with conventional hand tool drive means.

As the burnishing tool is rotated in a clockwise direction, the application of an even downward force by the hand of the user moves the front end of the burnishing section 36 further into the bore 12 while riding on alignment guide 22. The outer face portions 46 of the burnishing tool 36 snugly fit within governor bore 12 and provide substantial bearing surfaces 45 for the entire tool thereby aiding in proper alignment and maintaining alignment, of the tool and preventing any rocking or other transverse motion which could damage the bore surface.

When the burnishing section 36 of boring tool 30 has completely entered governor bore 12 the boring portion of the operation commences by virtue of cutting edges 48. The boring operation is intended to enlarge the governor bore 12 so as to provide a clean, perfectly cylindrical bore of slightly larger diameter than the original governor bore. This increase in diameter will subsequently be reduced by the insertion of a bushing having an internal diameter and an internal surface identical to that of the original governor bore.

The cutting and supporting function of the boring section 38 of the tool are accomplished by a further novel combination of structural features. As best illustrated in FIGS. 4–9 the boring section of the tool is divided into three sections each of which is provided with a cutting edge 48. Each of the three cutting edges is formed at a point immediately above a helical thread or groove 50 which is formed in each section on the uppermost portion of the burnishing section 36 of the tool and the lowermost portion of boring section 38. The upper section 52 of the helical groove defines the lowest surface of the boring section 38 of the tool which, of course, is of larger diameter than the burnishing section of the tool. Each cutting edge of the boring tool 48 is further defined by a hole 54 which is drilled inwardly into the tool and communicates with hollow 28 of the boring tool. While the diameter of the drilled hole is not critical its location is critical. The lower portion of the hole 54 terminates on the helical groove located on the burnishing portion of the tool while the majority of the hole is drilled into the main body of the larger diameter boring section of the tool. Each hole 54 is further defined by a flat portion 58, having a width equal to the diameter of the hole, on the otherwise cylindrical boring tool outer surface. It is the combination of holes 54 and flat portions 58 which divides boring section 38 into three distinct segments.

Figure 4:
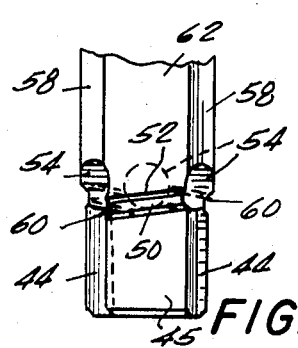
FIGS. 4 and 5 are partial perspective views of the lower portion of the boring tool.
Figure 6:
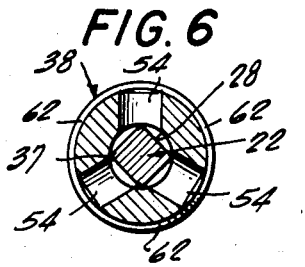
FIG. 6 is a sectional view taken along the line 6—6 of FIG. 3.
Figure 7:
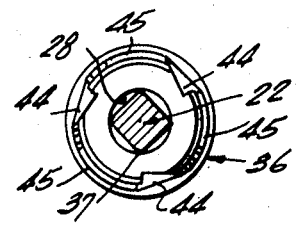
FIG. 7 is a sectional view taken along the line 7—7 of FIG. 3.

The combination of helical groove 50 with drill hole 54 and flat surface 58 defines a sharp cutting edge 60 best seen in FIG. 4. Upon clockwise rotation of the tool 30 that cutting edge will remove material from the internal diameter of governor bore 12 thereby enlarging that bore until its diameter is equal to the diameter of boring section 38 of the tool.

The structure of boring section 38 is uniquely self-supporting and, in a preferred embodiment of the invention, the boring operation may be accomplished without the utilization of alignment guide 22. Thus, in the typical operation of the tool, the cylindrical surfaces 62 of boring section 30 will act as substantial bearing and support members thereby preventing any rocking or transverse motion of the tool once it is inserted into the governor bore 12. Thus, while the burnishing operation previously described will be carried out while the alignment guide 22 is seated within bore 12, only the initial boring operation need take place while the alignment guide is seated. The combination of the bearing surfaces 45 of burnishing section 36 and bearing walls 60 of the boring section will adequately support and align the tool without the use of the alignment guide. The elimination of the alignment guide in this phase of the operation provides a substantial advantage since the cutting tool surfaces may then be lubricated by the addition of a lubricating fluid through tool hollow 28 which communicates with drill holes 54. Moreover, the drill holes 54 provide an escape route for debris formed during the cutting operation. The presence of the alignment guide within hollow 28 would block the communication between hollow 28 and drill holes 54 thereby preventing escape of particles and the effective addition of lubricant.

Figure 8:
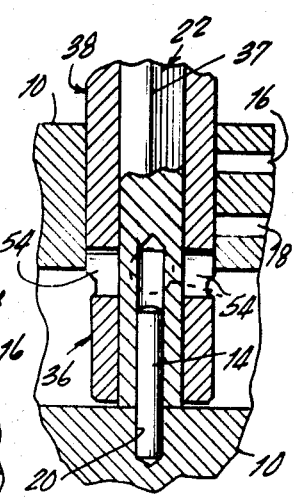
FIG. 8 is a partial sectional view illustrating the cooperation between the boring tool and the governor valve bore at the completion of the boring operation.
Figure 5:
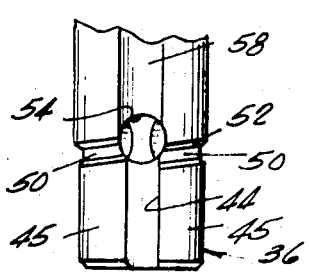

As best seen in FIG. 8, the boring operation is continued until cutting surface 60 of the boring tool has passed completely through the outer surface of transmission housing 10 and effectively enlarged the diameter of the governor bore 12 so that it is equal to the outer diameter of the boring section 38 of tool 30. Once the governor bore has been enlarged, it is ready to accept a bushing 64 having an outer diameter equal to the internal diameter of the newly bored governor bore 12 and having an internal diameter equal to the original diameter of the governor bore. Thus, as previously described the bushing, once inserted, will serve as the new governor bore and is therefore provided with openings 66 and 68 adapted to mate with fluid control channels 16 and 18.

The bushing is inserted into the transmission housing 10 and particularly bore 12 by means of a bushing aligner or installer tool 32. As previously described, bushing installer 32 has an internal cavity or hollow 34 which mates with alignment guide 22 to insure that the bushing is centered over the bore 12 and will be properly fitted therein. The bushing tool 32 is provided with a bushing holder section 70 and a handle portion or driving section 72. The sleeve holder 70 has an external diameter equal to the internal diameter of the bushing whereas the diameter of the handle portion 72 exceeds that of bushing 64 so as to provide a bearing surface 74 which retains the bushing on the tool during the installing operation. Bushing holder section 70 may, in a preferred embodiment, be provided with an undercut section 76 having a slightly smaller diameter than the main portion of bushing holder 70 as a precaution against binding or excessive friction between the bushing 64 and the bushing tool 32.

From the foregoing description it will be evident that the following sequence of operations occurs when using the above-described tools. A governor valve, schematically represented as 78 in FIG. 12 is removed from governor bore 12. Alignment guide 22 is inserted into governor bore 12 and positioned on governor dowel peg 14. Burnishing and boring tool 30 is brought into slidable engagement with alignment guide 22 by means of hollow 28 in the guide. The internal surfaces of governor bore 12 are burnished by means of burnishing section 36 of the tool 30 and the bore 12 is thereafter enlarged by means of boring section 38 provided with cutting edges or surfaces 60. Both the boring and burnishing operations are accomplished by the hand operated clockwise rotation of the boring tool 30 at its head 42. In a preferred embodiment, the alignment guide 22 is removed after the burnising operation and support for the boring tool 30 is provided solely by the exterior surfaces of burnishing section 46 and boring section surfaces 62. Lubrication and removal of debris from the boring operation is then accomplished by means of communication between hollow 28 of the boring tool 30 and drill holes 54 located at the cutting surface.

When the boring operation is completed boring tool 30 is removed from governor bore 12. The alignment guide 22 is reinserted in position over governor dowel peg 14 and a bushing 64 is inserted in the enlarged governor bore by placing the bushing on a holder section of a bushing installer tool 32 and driving it into position by hammering on the end 72 of the bushing installer. The tool 32 will ride longitudinally on alignment guide 22 thereby forcing the bushing into the enlarged bore. Ports 66 and 68 are hand aligned prior to inserting the bushing so that they will mate with fluid control channels 16 and 18. When the bushing is installed within governor bore 12 a new internal surface is provided which has dimensions and characteristics identical with the original governor bore. The governor valve 78 may then be reinserted into the transmission housing and the repair is completed.

It will be understood by those persons skilled in the art that a variety of modifications may be made without departing from the scope of the invention, the true scope of which will now be pointed out in the appended claims.

What is claimed is:

1. Apparatus for repairing a bore comprising an alignment guide, said alignment guide having means for removably mounting it in the axis of a bore, first tool means for enlarging said bore, said first tool means comprising a hollow interior, said alignment guide being slidably engageable with said hollow interior, and a boring section on said first tool means having a diameter greater than said bore, said boring section having at least one cutting edge for enlarging said bore, second tool means for installing a bushing in the enlarged bore, said second tool means having a bushing holder section and a bushing driving section and having a hollow interior, said alignment guide being slidably engageable with said hollow interior.

2. Apparatus in accordance with claim 1 wherein said first tool means is provided with a burnishing section, adjacent to said boring section.

3. Apparatus in accordance with claim 2 wherein said burnishing section is generally cylindrical in cross-section and has a diameter substantially equal to the original bore, the surface of said burnishing section being adapted to slidably engage the walls of said bore.

4. Apparatus in accordance with claim 1 wherein said bore is a governor valve bore in a transmission housing, said bore having a governor valve dowel pin positioned beneath said bore, said alignment guide being removably mountable on said pin.

5. Apparatus in accordance with claim 1 wherein said first tool means has a head portion adapted to receive means for rotation of said first tool means.

6. Apparatus in accordance with claim 2 wherein said boring tool has at least one cutting edge, said cutting edge being formed by a helical groove in the portion of said burnishing section adjacent to said boring section, a hole formed in a portion of said helical groove and in said boring and burnishing sectons said hole communicating with said hollow interior of said first tool means, and a longitudinally disposed flattened portion on said boring section, said hole being positioned within said flattened section.

7. Apparatus for repairing a governor valve bore in a transmission housing comprising, an alignment guide, said alignment guide having means for removably mounting it in the axis of said bore, first tool means for enlarging said bore, said first tool means comprising a hollow interior, said alignment guide being slidably engageable with said hollow interior, a generally cylindrical burnishing section having a diameter substantially equal to the diameter of said bore and a boring section having a diameter greater than said burnishing section, said boring section having at least one cutting edge for enlarging said bore, second tool means for installing a bushing in the enlarged bore, said second tool means comprising a hollow interior, said alignment guide being slidably engageable with said hollow interior, a generally cylindrical bushing holder section having a diameter substantially equal to the internal diameter of said bushing and a bushing driving section having a diameter greater than said holder section.

8. Apparatus for enlarging a bore comprising an alignment guide, said alignment guide having means for removably mounting it in the axis of a bore and a tool for enlarging said bore, said tool having a hollow interior, said alignment guide means slidably engageable with said hollow interior and a boring section having at least one cutting edge for enlarging said bore, said boring section having a diameter greater than said bore.

9. Apparatus in accordance with claim 8 wherein said alignment guide has a generally square cross-section and is provided with bearing surfaces adapted to slidably engage said hollow interior.

10. Apparatus in accordance with claim 8 wherein said tool is provided with a burnishing section adjacent to said boring section, said burnishing section having a generally cylindrcal cross-secton and a diameter substantially equal to the original bore diameter.

11. Apparatus in accordance with claim 8 wherein said cutting edge is formed by a helical groove in the portion of said burnishing section adjacent to said boring section, a hole formed in a portion of said helical groove and in said boring and burnishing sections, said hole communicating with said hollow interior of said tool, said boring section having a longitudinally disposed flattened section, said hole being positioned within said flattened section.

12. Apparatus for installing a bushing in a bore comprising an alignment guide, said alignment guide having means for removably mounting it in the axis of the bore, and a bushing installer tool, said bushing installer tool having a hollow interior, said alignment guide being slidably engageable with said hollow interior, a bushing holder section having an external diameter approximately equal to the internal diameter of a bushing, and a bushing driving section having a diameter greater than the internal diameter of a bushing.

References Cited
UNITED STATES PATENTS

| 813,384 | 2/1906 | Kiefer | 29—278 UX |
| 1,603,471 | 10/1926 | Johnson et al. | 29—280 X |

GRANVILLE Y. CUSTER, JR., Primary Examiner

U.S. Cl. X.R.
29—271, 280